US012754555B2

(12) United States Patent
Yamaguchi et al.

(10) Patent No.: US 12,754,555 B2
(45) Date of Patent: Oct. 6, 2026

(54) DRIVING CONTROL SYSTEM, CONTROL SERVER, AND VEHICLE

(71) Applicant: SUBARU CORPORATION, Tokyo (JP)

(72) Inventors: Fumihito Yamaguchi, Tokyo (JP); Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 243 days.

(21) Appl. No.: 18/727,027

(22) PCT Filed: Oct. 18, 2022

(86) PCT No.: PCT/JP2022/038767

§ 371 (c)(1),
(2) Date: Jul. 5, 2024

(87) PCT Pub. No.: WO2024/084581

PCT Pub. Date: Apr. 25, 2024

(65) Prior Publication Data

US 2026/0178033 A1 Jun. 25, 2026

(51) Int. Cl.
*G05D 1/227* (2024.01)
*G05D 1/226* (2024.01)

(Continued)

(52) U.S. Cl.
CPC ........... *G05D 1/2274* (2024.01); *G05D 1/226* (2024.01); *G05D 2107/13* (2024.01); *G05D 2109/10* (2024.01); *G05D 2111/32* (2024.01)

(58) Field of Classification Search
CPC .. G05D 1/2274; G05D 1/226; G05D 2107/13; G05D 2109/10; G05D 2111/32
See application file for complete search history.

(56) References Cited

U.S. PATENT DOCUMENTS 7,600,009 B2 * 10/2009 Soininen ............... H04W 76/15 709/228
11,938,960 B1 * 3/2024 Greenbaum ............. G08G 1/04

(Continued)

FOREIGN PATENT DOCUMENTS

CN 110837251 A * 2/2020 ............. G05D 1/021
CN 114879650 A * 8/2022 ........... G05D 1/0061

(Continued)

OTHER PUBLICATIONS

Machine translation of CN110837251 downloaded from IP.com, Apr. 22, 2026 (Year: 2026).*

(Continued)

*Primary Examiner* — Kito R Robinson
*Assistant Examiner* — Tanya C Sienko
(74) *Attorney, Agent, or Firm* — Rimon P.C.

(57) ABSTRACT

A driving control system includes: a first communication controller that is provided in a vehicle and performs communication with outside by selectively using packet-switched circuit-switched communication; a second communication controller that is provided in a control server and performs communication with outside by selectively using the packet-switched or circuit-switched communication; a first travel controller that is provided in the vehicle and makes an autonomous travel control of the vehicle based on travel environment information; a second travel controller that is provided in the control server and makes a remote travel control of the vehicle based on travel environment information. When recognizing a decline in a communication response rate with the vehicle or a communication abnormality while making the remote travel control by using the packet-switched communication, the second travel controller commands, by using the circuit-switched communication, the vehicle to switch to the autonomous travel control.

11 Claims, 11 Drawing Sheets

(51) Int. Cl.
*G05D 107/13* (2024.01)
*G05D 109/10* (2024.01)
*G05D 111/30* (2024.01)

(56) References Cited

U.S. PATENT DOCUMENTS

| | | | | |
|---|---|---|---|---|
| 2005/0025134 | A1* | 2/2005 | Armistead | H04M 7/0057 370/352 |
| 2019/0163202 | A1 | 5/2019 | Hatano et al. | |
| 2021/0377707 | A1* | 12/2021 | Pfadler | H04W 28/0967 |
| 2023/0376042 | A1* | 11/2023 | Wittenschlaeger | B62D 33/04 |

FOREIGN PATENT DOCUMENTS

| | | | | | |
|---|---|---|---|---|---|
| EP | 3690586 | A1 | * | 8/2020 | B60W 60/005 |
| JP | 2019021200 | A | * | 2/2019 | G05D 1/6987 |
| JP | 2021144732 | A | * | 9/2021 | G05D 1/6987 |
| WO | 2017/179209 | A1 | | 10/2017 | |

OTHER PUBLICATIONS

Machine translation of CN114879650 downloaded from IP.com, Apr. 22, 2026 (Year: 2026).*
Machine translation of JP2019021200 downloaded from IP.com, Apr. 21, 2026 (Year: 2026).*
Machine translation of JP2021144732 downloaded from IP.com, Apr. 21, 2026 (Year: 2026).*
International Search Report received in PCT Application No. PCT/JP2022/038767, dated Jan. 10, 2023.

* cited by examiner

[ FIG. 1 ]
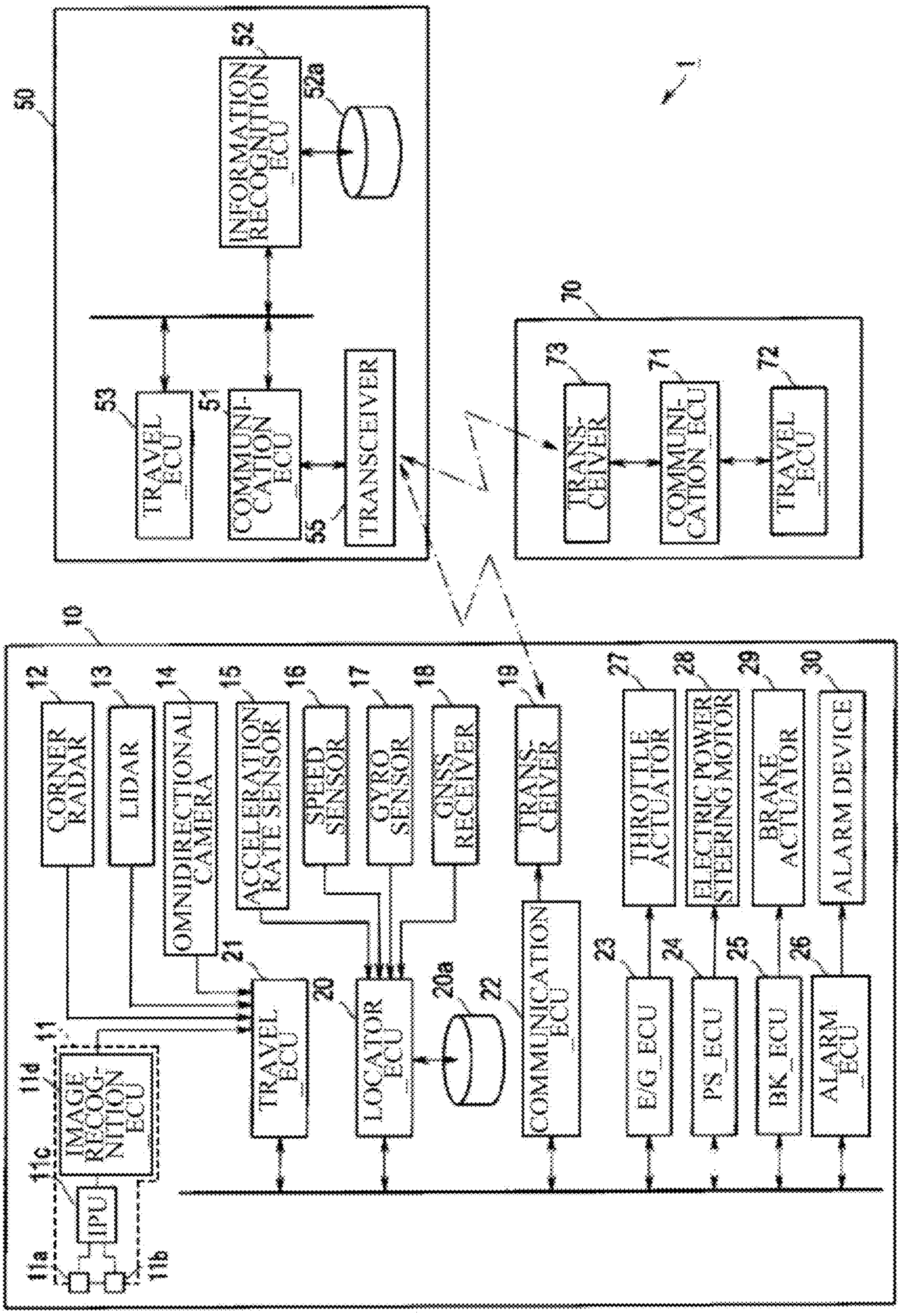

[ FIG. 2 ]
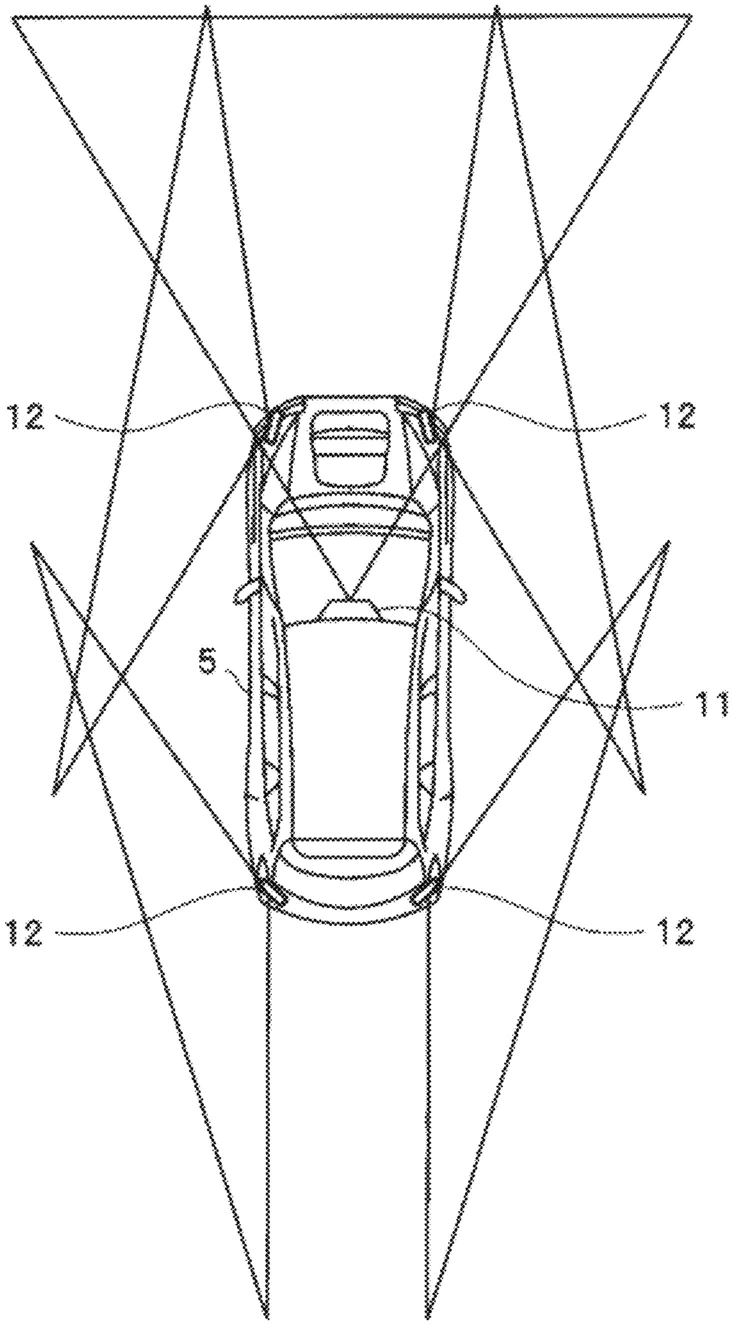

[ FIG. 3 ]
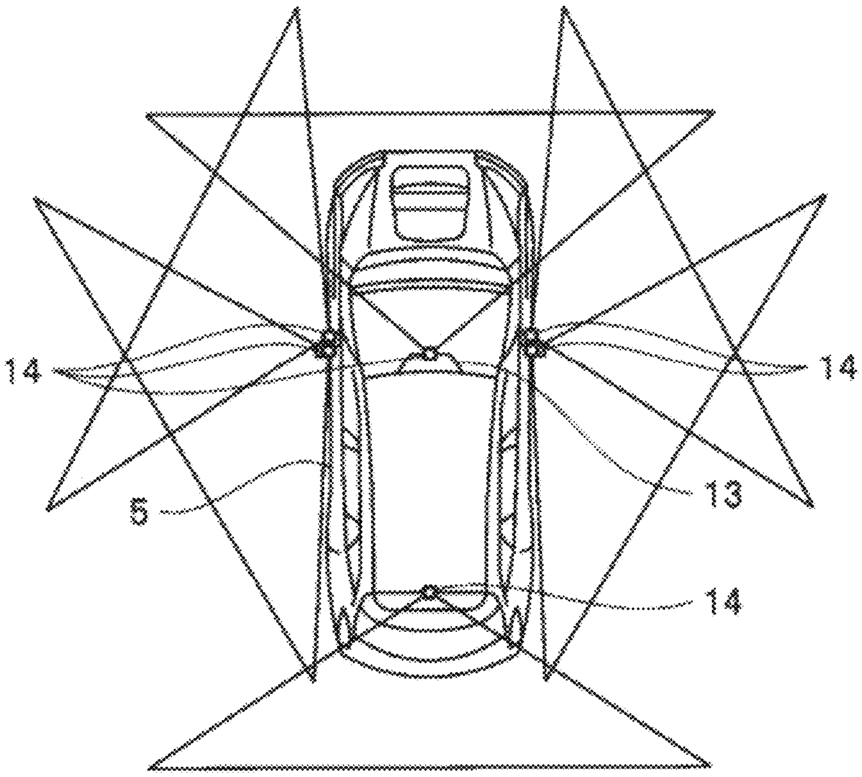

[ FIG. 4 ]
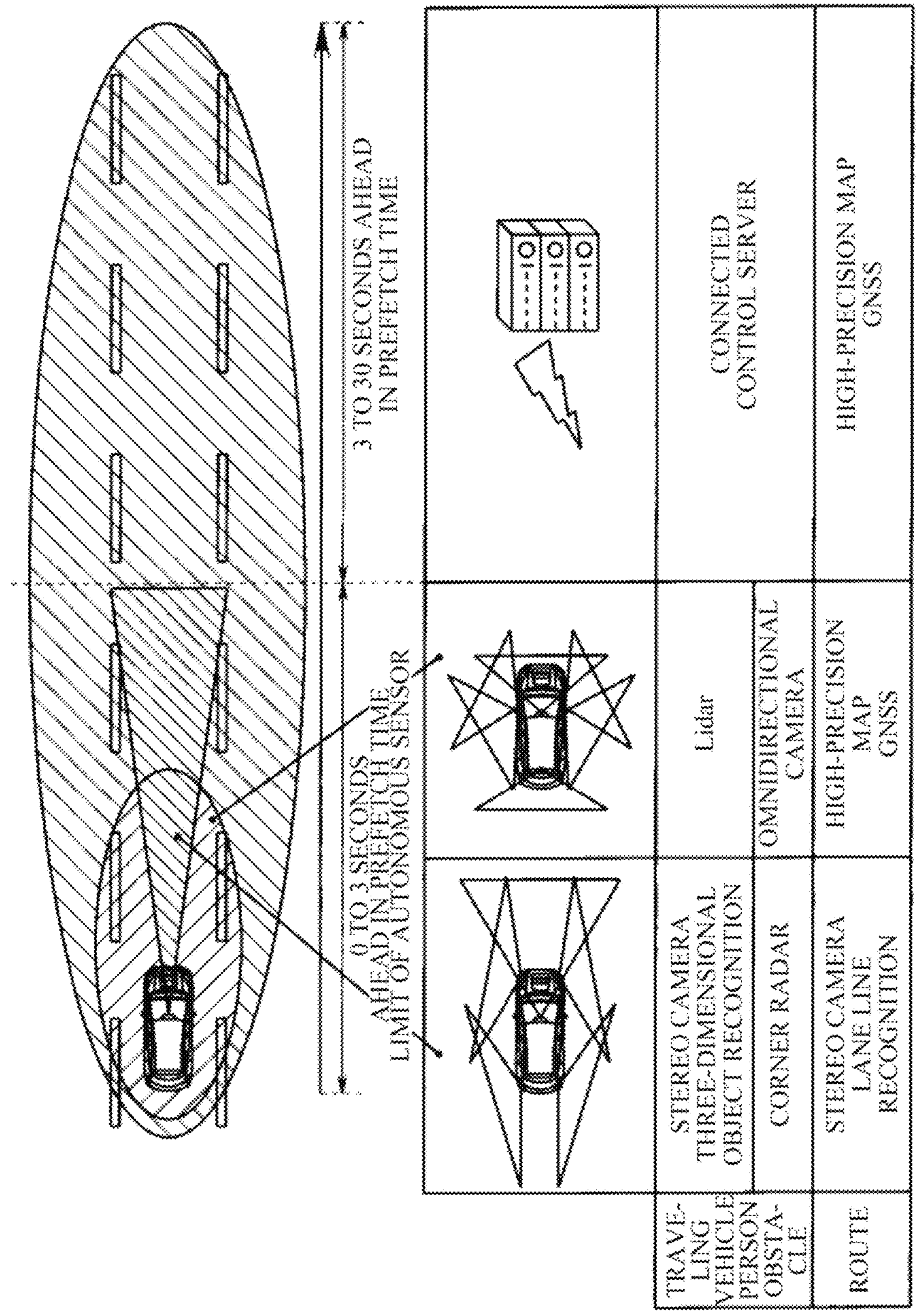

[FIG. 5]
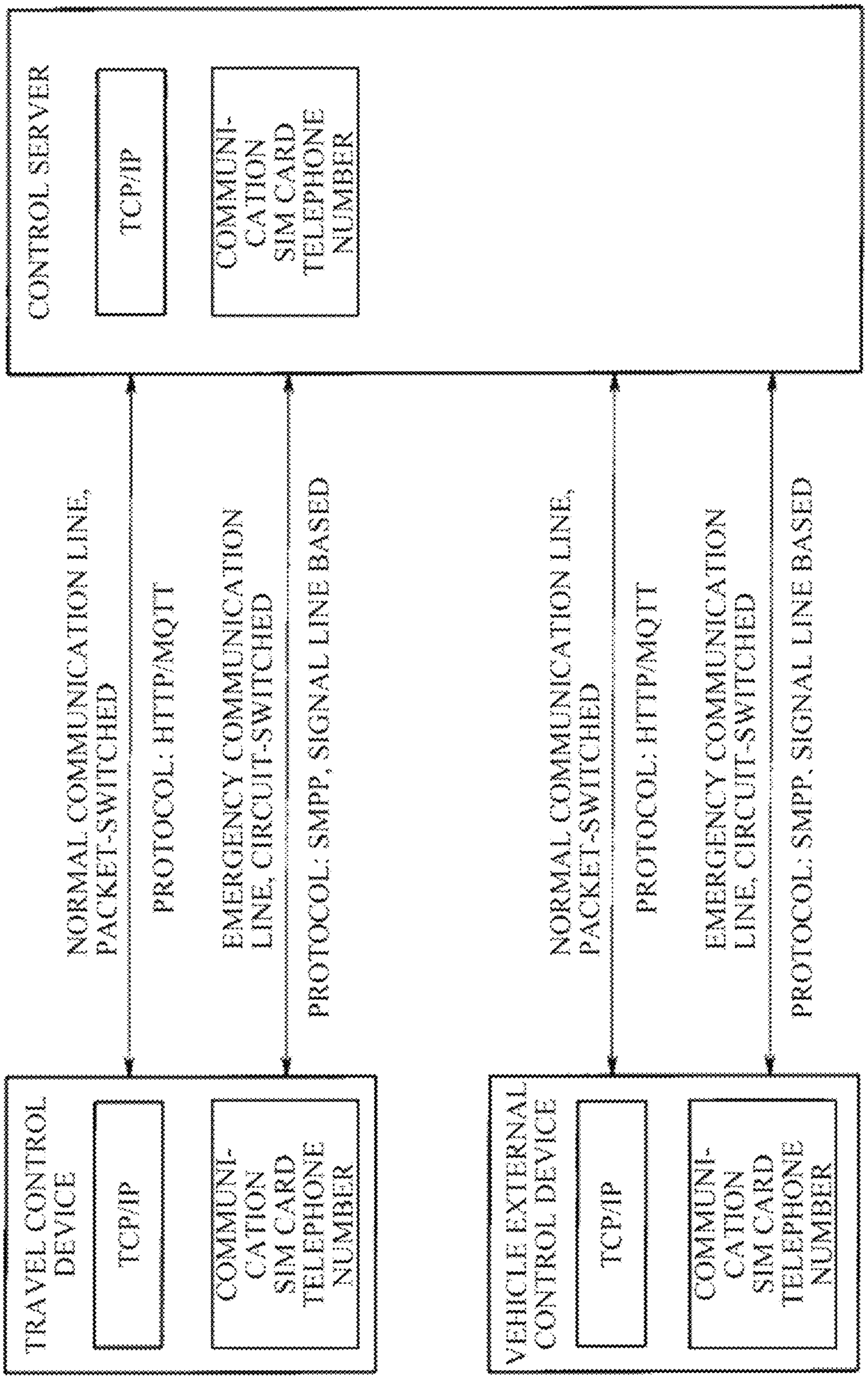

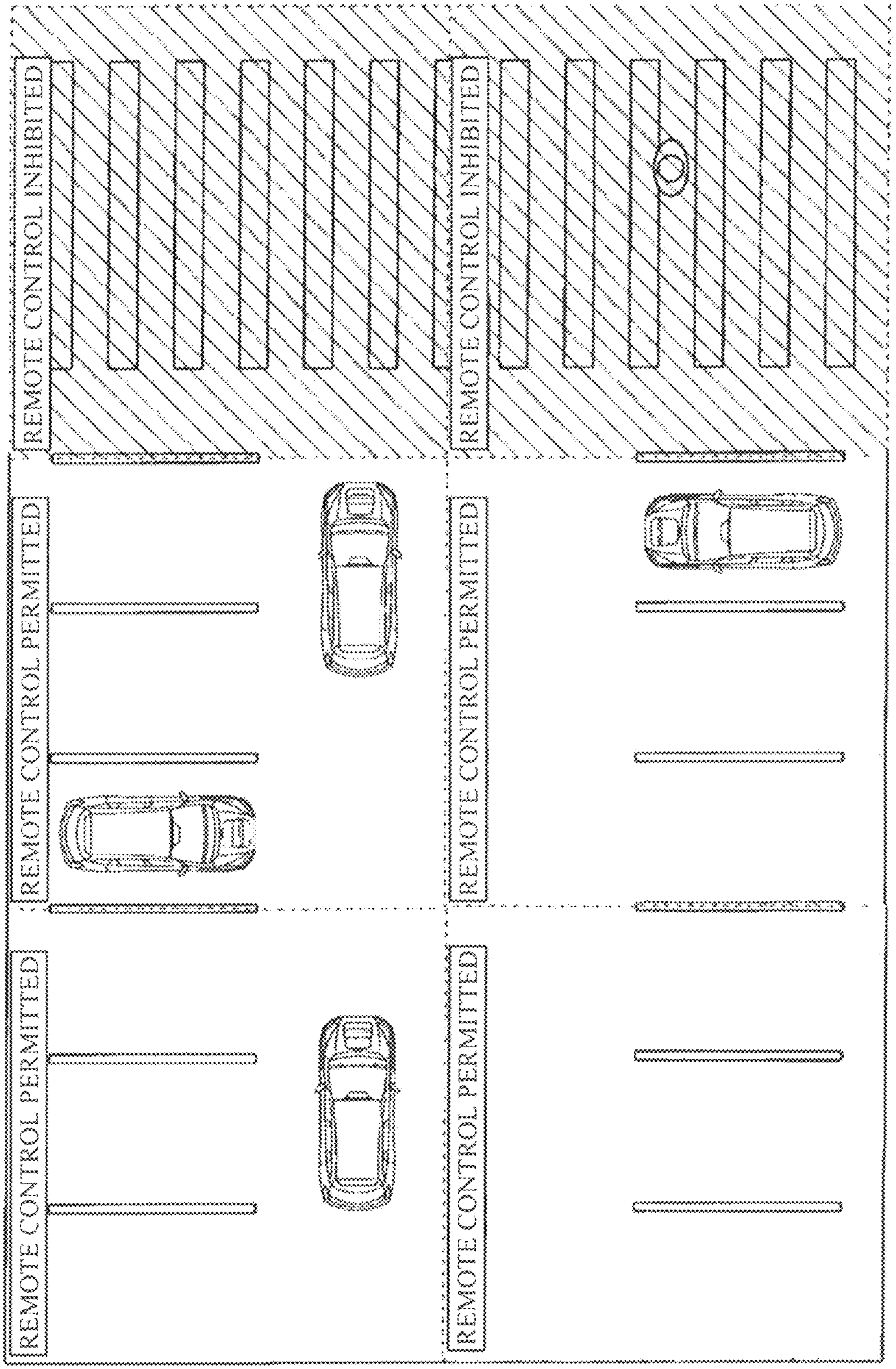
[ FIG. 6 ]

[ FIG. 7 ]
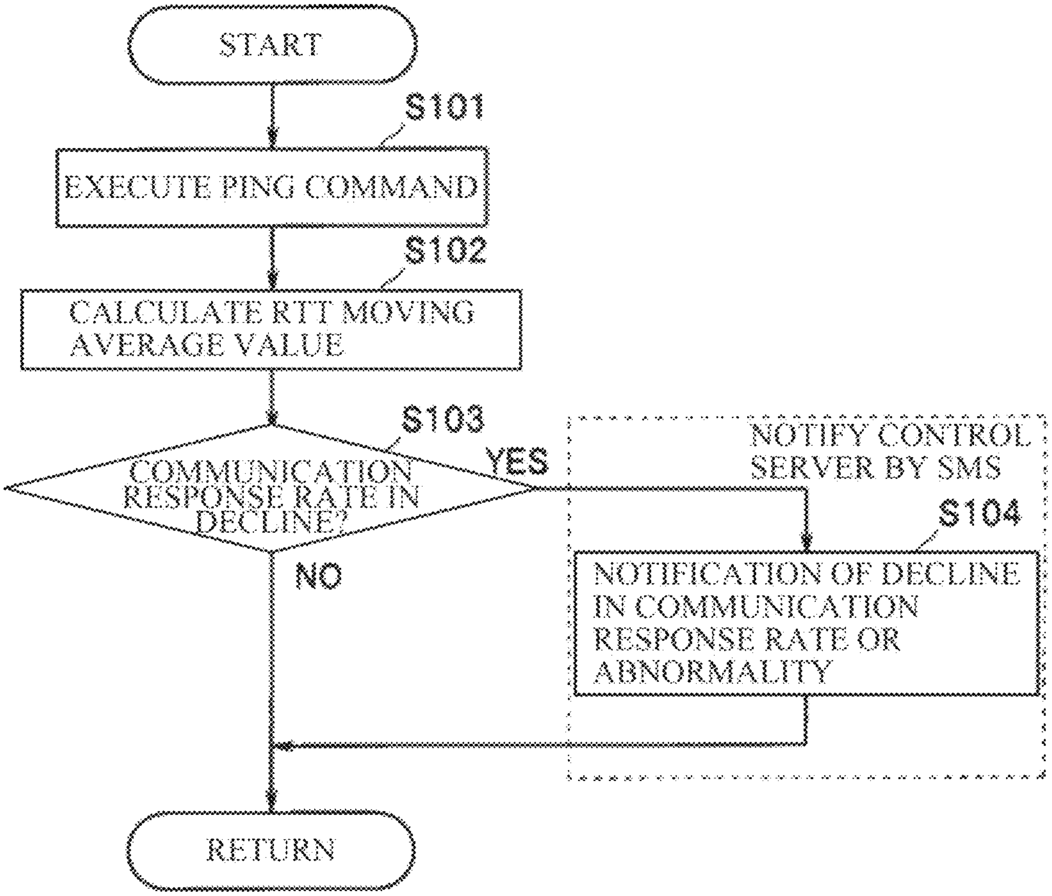

[FIG. 8]
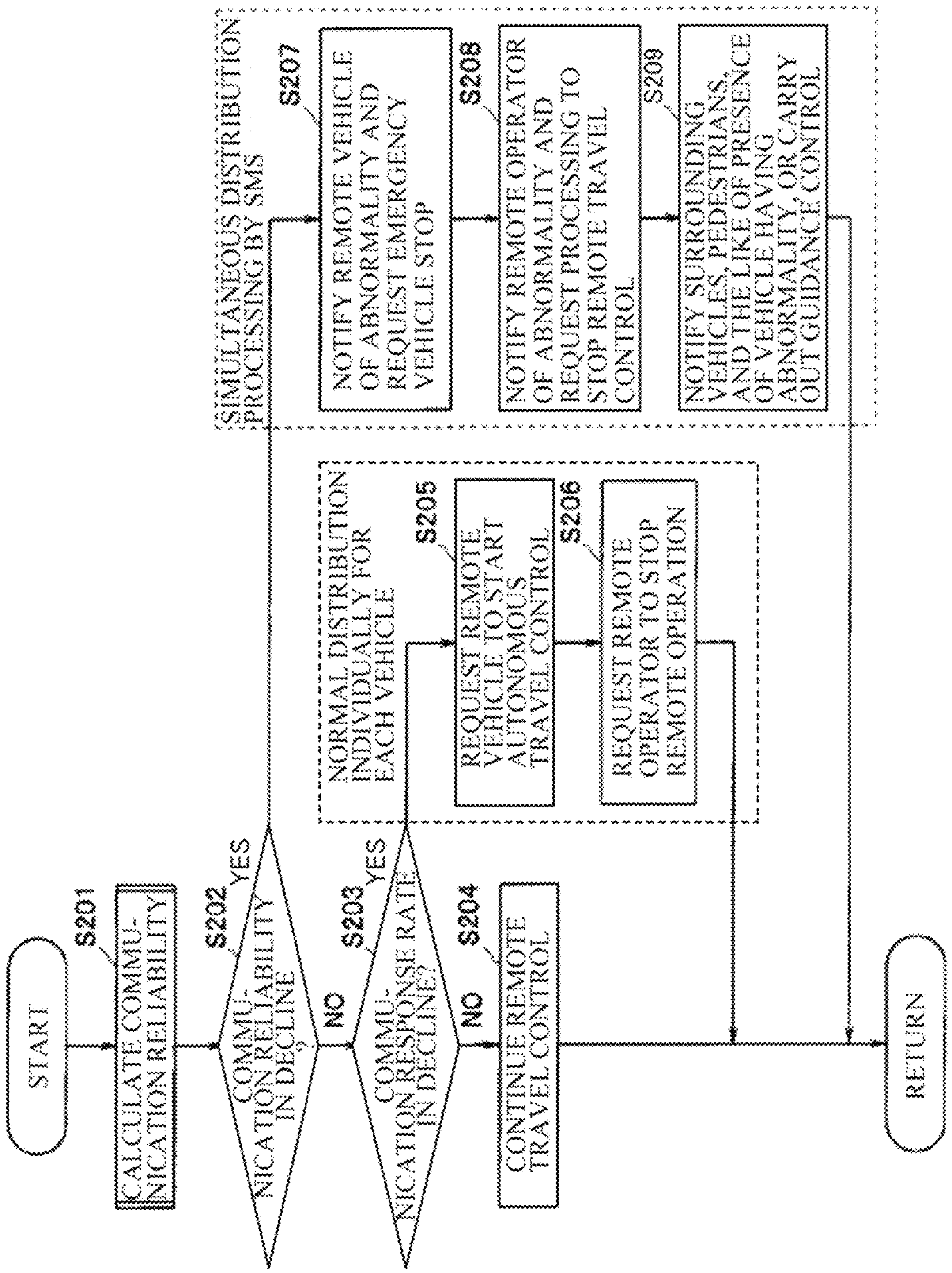

[ FIG. 9 ]
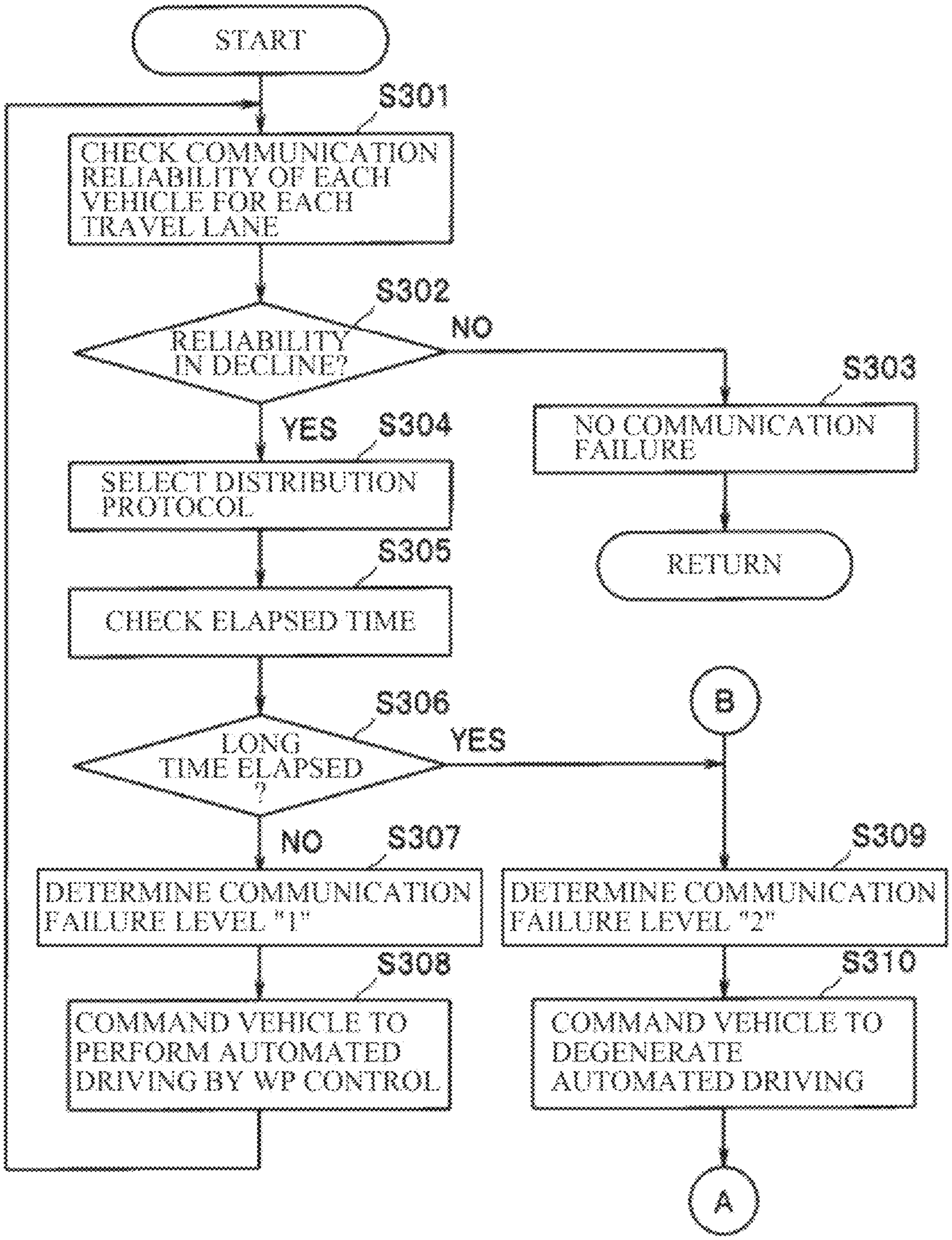

[ FIG. 10 ]
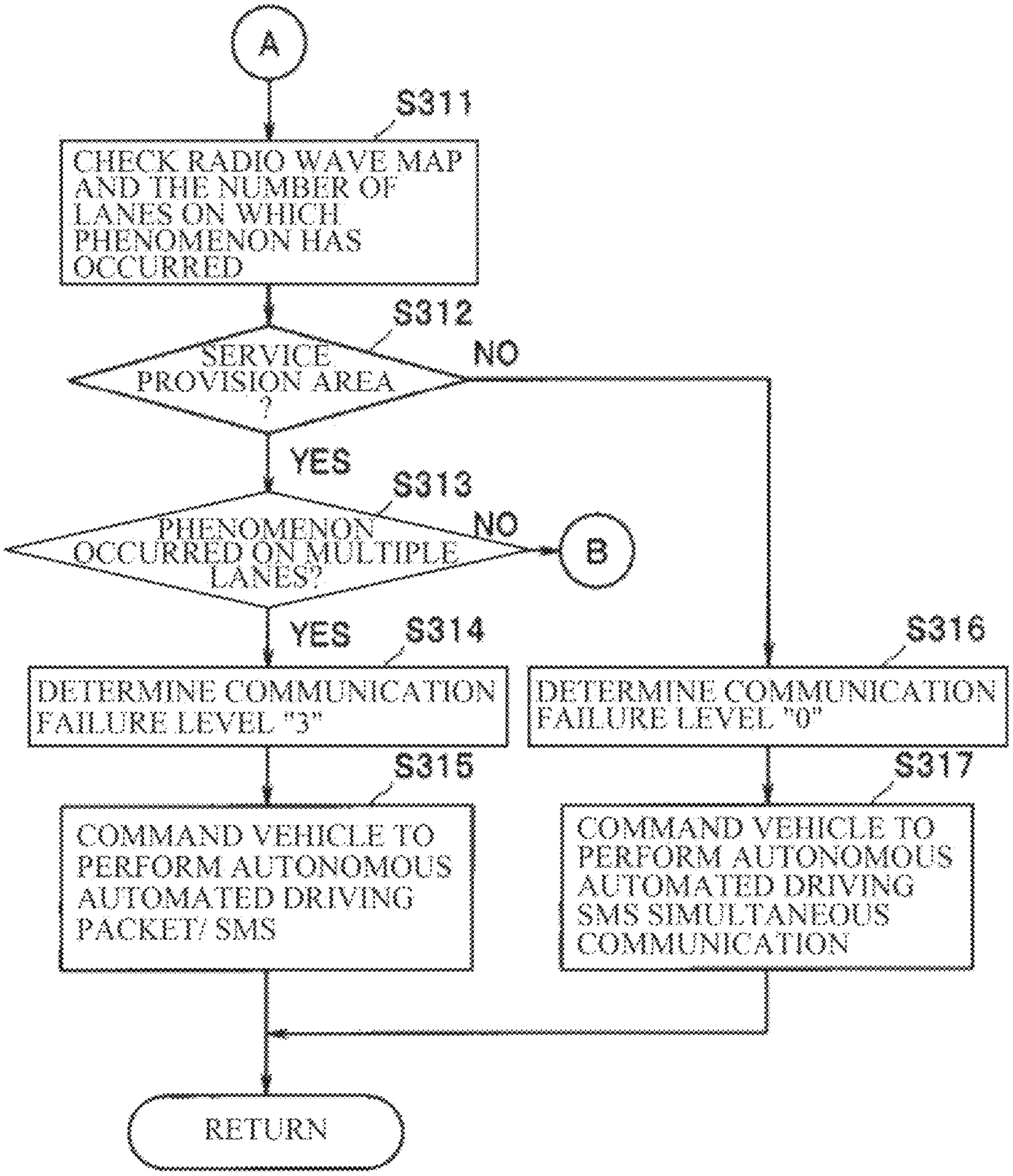

[ FIG. 11 ]
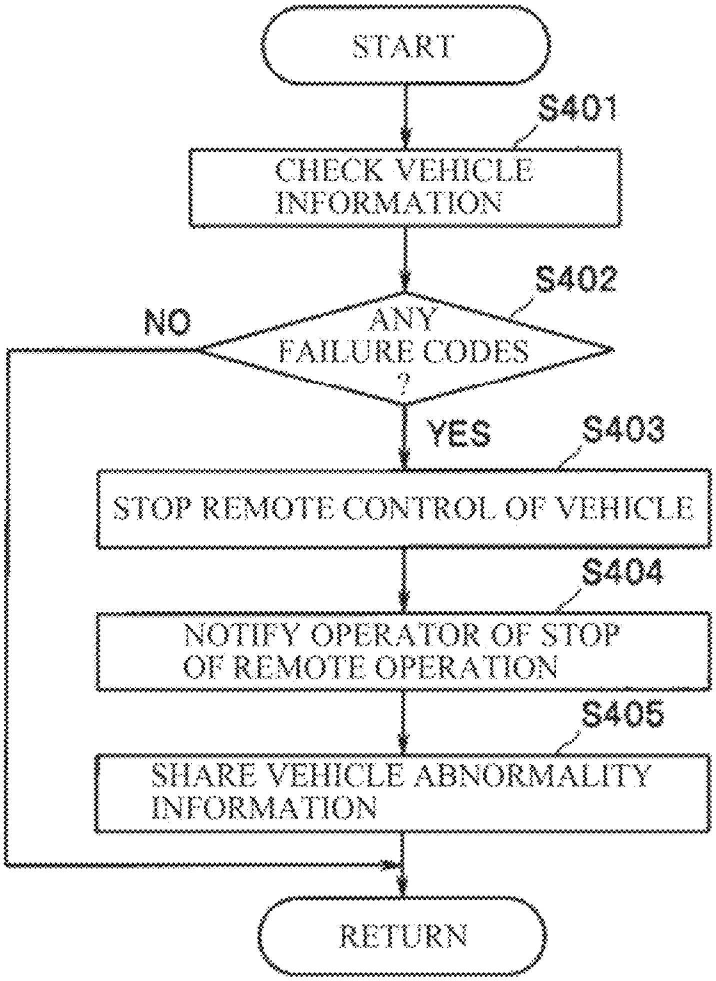

DRIVING CONTROL SYSTEM, CONTROL SERVER, AND VEHICLE

CROSS-REFERENCE TO RELATED APPLICATIONS

This application is the U.S. National Phase under 35 U.S.C. § 371 of International Application No. PCT/JP2022/038767, filed on Oct. 18, 2022.

TECHNICAL FIELD

The invention relates to a driving control system, a control server, and a vehicle configured to perform communication about control information between a vehicle and a server outside the vehicle.

BACKGROUND ART

In recent years, as for vehicles such as automobiles, a driving control device has been put into practical use for the purpose of reducing a burden on a driver making driving operations and realizing enhancement in safety. The driving control device is provided for assisting a driver with driving operations. Levels of a driving control (travel control) by the driving control device is defined in six stages: Level 0; Level 1 (driver assistance); Level 2 (partial automated driving); Level 3 (conditional automated driving); Level 4 (advanced automated driving); and Level 5 (fully automated driving).

For a driving control device of this kind to realize a higher level of the driving control, it is necessary to acquire wide-area travel environment information around the vehicle in detail in real time. Thus, in recent years, proposals have been made for techniques of supplementing the travel environment information acquired by, for example, an in-vehicle autonomous sensor with information from outside the vehicle, in cooperation with, for example, a control server outside the vehicle by using high-speed communication.

For example, International Patent Application Publication WO 2017/179209 A1 discloses a vehicle control system (driving control system) including a communication device, a detector, and a driver assistance controller. The communication device communicates with an external control server (server device). The detector detects a state of surroundings of a subject vehicle. The driver assistance controller automatically makes at least a part of a driving control of the subject vehicle based on the state of the surroundings of the subject vehicle. This driving control system requests the control server for travel environment information (environment information) related to a road on which the subject vehicle travels, by using the communication device. Thus, the driving control system is configured to reflect the travel environment information received from the control server in the driving control.

However, in the driving control system cooperating with the external control server or the like as described above, as a safety measure against various failures, it is necessary to make the driving control in consideration of not only a failure of an in-vehicle driving control device but also a communication failure between the vehicle and the control server or the like. Meanwhile, to ensure a high level of convenience by the driving control, it is desirable to continue the driving control at the highest possible level even on the occasion of a failure or the like.

An object of the invention is to provide a driving control system, a control server, and a vehicle that makes it possible to balance between securing convenience and securing safety.

Means for Solving the Problem

An aspect of the invention provides a driving control system including: a first communication controller configured to be provided in a vehicle and perform communication with outside by selectively using packet-switched communication or circuit-switched communication; a second communication controller that is provided in a control server and performs communication with outside by selectively using the packet-switched communication or the circuit-switched communication; a first travel environment information obtainer that is provided in the vehicle and acquires first travel environment information using an autonomous sensor; a second travel environment information obtainer that is provided in the control server and acquires second travel environment information based on information collected by using the packet-switched communication; a first travel controller that is provided in the vehicle and makes an autonomous travel control of the vehicle based on the first travel environment information; and a second travel controller that is provided in the control server and makes a remote travel control of the vehicle based on the second travel environment information. When the second travel controller recognizes a decline in a communication response rate with the vehicle or a communication abnormality while making the remote travel control by using the packet-switched communication, the second travel controller commands, by using the circuit-switched communication, the vehicle to switch from the remote travel control to the autonomous travel control.

An aspect of the invention provides a driving control system including: a first transceiver configured to be provided in a vehicle and perform packet-switched communication and circuit-switched communication; an autonomous sensor configured to be provided in the vehicle and acquires first travel environment information; a first processor configured to be provided in the vehicle; a second transceiver configured to be provided in a control server and perform the packet-switched communication and the circuit-switched communication; and a second processor configured to be provided in the control server. The first processor is configured to perform communication with outside by selectively using the packet-switched communication or the circuit-switched communication by the first transceiver, and make an autonomous travel control of the vehicle based on the first travel environment information. The second processor is configured to perform communication with outside by selectively using the packet-switched communication or the circuit-switched communication by the second transceiver, acquire second travel environment information based on information collected by using the packet-switched communication, make a remote travel control of the vehicle based on the second travel environment information, and when recognizing a decline in a communication response rate with the vehicle or a communication abnormality while making the remote travel control by using the packet-switched communication, command, by using the circuit-switched communication, the vehicle to switch from the remote travel control to the autonomous travel control.

An aspect of the invention provides a control server configured to communicate with a vehicle. The vehicle includes: a first communication controller configured to perform communication with outside by selectively using packet-switched communication and circuit-switched communication; a first travel environment information obtainer configured to acquire first travel environment information using an autonomous sensor; and a first travel controller configured to make an autonomous travel control of the vehicle based on the first travel environment information. The control server includes: a second communication controller configured to perform communication with outside by selectively using the packet-switched communication or the circuit-switched communication; and a second travel environment information obtainer configured to acquire second travel environment information based on information collected by using the packet-switched communication; and a second travel controller configured to make a remote travel control of the vehicle based on the second travel environment information. The second travel controller is configured to, when the second travel controller recognizes a decline in a communication response rate with the vehicle or a communication abnormality while making the remote travel control by using the packet-switched communication, command, by using the circuit-switched communication, the vehicle to switch from the remote travel control to the autonomous travel control.

An aspect of the invention provides a vehicle including: a communication controller configured to perform communication with a control server by selectively using packet-switched communication or circuit-switched communication; an autonomous sensor configured to acquire travel environment information; and a travel controller configured to make an autonomous travel control based on the travel environment information and a remote travel control based on a command from the control server. The communication controller is configured to, while making the remote travel control by using the packet-switched communication, determine a communication state with the control server by the packet-switched communication. The communication controller is configured to, when the communication state is in decline to a predetermined level, transmit, by using the circuit-switched communication, a signal indicating the decline in the communication state, to the control server, and receive a signal indicating a travel control switching command transmitted from the control server by using the circuit-switched communication in accordance with the decline in the communication state. The travel controller is configured to switch from the remote travel control to the autonomous travel control based on the signal indicating the travel control switching command.

BRIEF DESCRIPTION OF DRAWINGS

FIG. 1 is an overall configuration diagram of a driving control system.

FIG. 2 is a schematic diagram illustrating a region in which travel environment information is acquired by a first autonomous sensor group.

FIG. 3 is a schematic diagram illustrating a region in which the travel environment information is acquired by a second autonomous sensor group.

FIG. 4 is an illustrative diagram illustrating the region covered by the travel environment information acquired by each autonomous sensor group and a control server.

FIG. 5 is an illustrative diagram schematically illustrating a communication system of the driving control system.

FIG. 6 is an illustrative diagram illustrating a remote control inhibited area.

FIG. 7 is a flowchart of a routine of a determination as to a decline in a communication response rate between the vehicle and the control server.

FIG. 8 is a flowchart of a routine of a failure countermeasure control on the occasion of a communication failure between the vehicle and the control server.

FIG. 9 is a flowchart (part 1) of a routine of the failure countermeasure control on the occasion of a communication failure in a control area.

FIG. 10 is a flowchart (part 2) of the routine of the failure countermeasure control on the occasion of the communication failure in the control area.

FIG. 11 is a flowchart of a routine of the failure countermeasure control on the occasion of a vehicle failure.

MODES FOR CARRYING OUT THE INVENTION

In the following, some embodiments of the invention are described with reference to the drawings. The drawings are related to an embodiment of the invention, and FIG. 1 is an overall configuration diagram of a driving control system.

As illustrated in FIG. 1, a driving control system 1 of this embodiment includes a driving control device 10, multiple control servers 50, and a vehicle external driving control device 70. The driving control device 10 is mounted on a vehicle 5 as a moving body. The multiple control servers 50 include narrow-area servers provided in network environment. The vehicle external driving control device 70 makes a driving control of the vehicle 5 through the control servers 50.

The driving control device 10 includes, for example, a stereo camera unit 11, multiple corner radars 12, LIDAR (Light Detection and Ranging, Laser Imaging Detection and Ranging) 13, and an omnidirectional camera 14, as autonomous sensing devices that are provided in the vehicle 5 and acquire travel environment. Moreover, as various control units, the driving control device 10 includes a locator control unit (hereinafter, referred to as "locator_ECU") 20, a travel control unit (hereinafter, referred to as "travel_ECU") 21, a communication control unit (hereinafter, referred to as "communication_ECU") 22, an engine control unit (hereinafter, referred to as "E/G_ECU") 23, a power steering control unit (hereinafter, referred to as "PS_ECU") 24, a brake control unit (hereinafter, referred to as "BK_ECU") 25, and an alarm control unit (hereinafter, referred to as "alarm_ECU") 26. These control units 20 to 26 are coupled together through an in-vehicle communication line such as a CAN (Controller Area Network).

Here, in this embodiment, the stereo camera unit 11, the multiple corner radars 12, the LIDAR 13, the omnidirectional camera 14, and the locator_ECU 20 correspond to a specific example of a first travel environment information obtainer.

The stereo camera unit 11 is fixed to, for example, the middle of an upper part of a front portion of a cabin. This stereo camera unit 11 includes, for example, an in-vehicle camera (stereo camera) including a main camera 11*a* and a sub-camera 11*b*, an image processing unit (IPU) 11*c*, and an image recognition control unit (hereinafter, referred to as "image recognition_ECU") 11*d*.

The main camera 11*a* and the sub-camera 11*b* perform sensing of, for example, real space in front of the vehicle 5 from different viewpoints on left and right sides. Thus, the main camera 11*a* and the sub-camera 11*b* are arranged at horizontally symmetrical positions, for example, across the vehicle-widthwise midpoint of the vehicle 5.

The IPU 11*c* processes, as predetermined, a pair of left and right images (stereo images) stereo-captured by both of the cameras 11*a* and 11*b* to generate distance image information. That is, the IPU 11*c* calculates an amount of positional deviation between pixels indicating the same object in the left and right images. Thus, the IPU 11*c* calculates a distance from the vehicle 5 to the pixel indicating an object outside the vehicle. Thus, the IPU 11*c* generates image information (distance image information) in which each pixel indicating a target outside the vehicle includes distance information.

The image recognition_ECU 11*d* performs, for example, predetermined pattern matching with respect to the distance image information. Thus, the image recognition_ECU 11*d* obtains, for example, a lane line that separates the road. Furthermore, the image recognition_ECU 11*d* recognizes three-dimensional objects such as guardrails and curbstones that are present along the road, and pedestrians, two-wheeled vehicles, and other vehicles than two-wheeled vehicles that are present on the road. Here, three-dimensional object recognition in the image recognition_ECU 11*d* includes, for example, recognition of the kind of the three-dimensional object, a distance to the three-dimensional object, a speed of the three-dimensional object, and the like.

The corner radars 12 are provided, for example, on the left and right side portions of a front bumper and on the left and right side portions of a rear bumper of the vehicle 5. These corner radars 12 include, for example, millimeter wave radars. In this case, each corner radar 12 emits radar waves in a horizontal direction in each frame period set in advance, and receives reflected waves of the emitted radar waves. Thus, each corner radar 12 detects multiple reflection points on a three-dimensional object present around the subject vehicle 5. Moreover, each corner radar 12 groups, as predetermined, the detected multiple reflection points, to recognize the three-dimensional object. Furthermore, each corner radar 12 sets, as a representative point of the three-dimensional object, a reflection point having the smallest straight-line distance to the subject vehicle 5, out of the reflection points on the recognized three-dimensional object. Thus, each corner radar 12 recognizes, for example, a position and a moving speed of the reflection point corresponding to the representative point, as information regarding the representative point, and recognizes a size of the three-dimensional object calculated from distribution of the reflection points.

Here, for example, as illustrated in FIG. 2, at least a part of a monitoring region of the stereo camera unit 11 and at least a part of a monitoring region of each corner radar 12 are superposed on each other. Thus, the stereo camera unit 11 and each corner radar 12 constitute a first autonomous sensor group to detect the travel environment information around the vehicle 5.

The LIDAR 13 is provided, for example, in the middle of a front portion of the vehicle 5 as shown in FIG. 3. The LIDAR 13 emits, for example, near-infrared pulsed laser light, and measures reflected light from a target. Thus, the LIDAR 13 accurately detects not only a distance to the target but also a position and a shape of the object.

It is to be noted that the LIDAR 13 is common to the stereo camera unit 11 as a sensor that outputs a distance-point group. However, because the stereo camera unit 11 is a passive sensor, the stereo camera unit 11 has an advantage of a higher sampling rate than that of the LIDAR 13. In contrast, because the LIDAR 13 is an active sensor, the LIDAR 13 has an advantage of stability of detection accuracy with respect to changes in brightness, as compared to the stereo camera unit 11. Accordingly, in this embodiment, the stereo camera unit 11 and the LIDAR 13 are complementary in relation to each other.

The omnidirectional camera 14 includes multiple cameras 14*a*. The cameras 14*a* are provided, for example, in the middle of the front portion of the vehicle 5, on left and right door mirrors of the vehicle 5, and in the middle of a rear portion of the vehicle 5. The camera 14*a* each detect three-dimensional objects outside the vehicle by, for example, known image recognition processing.

Here, for example, as illustrated in FIG. 3, at least a part of the monitoring region of the LIDAR 13 and at least a part of a monitoring region of the omnidirectional camera 14 are superposed on each other. Thus, the LIDAR 13 and the omnidirectional camera 14 constitute a second autonomous sensor group to detect the travel environment information regarding the surroundings of the vehicle 5.

It is to be noted that, in this embodiment, each piece of the travel environment information detected by the stereo camera unit 11, each corner radar 12, the LIDAR 13, and the omnidirectional camera 14 is outputted to, for example, the travel_ECU 21. Furthermore, each piece of the travel environmental information is transmitted from the travel_ECU 21 to the locator_ECU 20 and the communication_ECU 22 through, for example, the in-vehicle communication line such as the CAN.

The locator_ECU 20 estimates a subject-vehicle position on a road map. Thus, to the locator_ECU 20, sensors such as an acceleration rate sensor 15, speed sensors (wheel speed sensors) 16, a gyro sensor 17, and a GNSS receiver 18 are coupled. The sensors are necessary in calculating positional coordinates of the subject vehicle 5. Here, the acceleration rate sensor 15 detects an acceleration rate of the vehicle 5. The speed sensors 16 detect rotational speeds of a front left wheel, a front right wheel, a rear left wheel, and a rear right wheel. The gyro sensor 17 detects an angular velocity or an angular acceleration rate of the subject vehicle. The GNSS receiver 18 receives positioning signals transmitted from multiple positioning satellites 50.

Moreover, a roadmap database 20*a* is coupled to the locator_ECU 20. The roadmap database 20*a* includes, for example, a mass storage medium such as a HDD. The roadmap database 20*a* holds high-precision roadmap information (dynamic map) as the travel environment information. The roadmap information includes three layers of information, e.g., static information, semi-dynamic information, and dynamic information. The static information mainly constitutes road information. The semi-dynamic information and the dynamic information mainly constitutes traffic information.

The static information includes, for example, information to be updated at frequency within one month, e.g., roads and structures on the roads, lane information, road surface information, and information regarding permanent regulations.

The semi-dynamic information includes, for example, information to be updated at frequency within one minute, e.g., actual congestion states and travel restrictions at the time of observation, states of temporary obstacles to travel such as falling objects and obstacles, actual accident states, and narrow-area weather information.

The dynamic information includes, for example, information to be updated at frequency within one second, e.g., information to be transmitted and exchanged between mobile bodies, information regarding current signaling of traffic lights, information regarding pedestrians and two-wheeled vehicles in an intersection, information regarding vehicles traveling straight through the intersection.

It is to be noted that the locator_ECU 20 updates, in real time, the information in each layer constituting the roadmap information, based on the travel environment information acquired by the various autonomous sensing devices. Furthermore, the locator_ECU 20 updates, in real time, the information in each layer constituting the roadmap information, based on the roadmap information (travel environment information) received from the control server 50 or the like by the communication_ECU 22 described later.

Here, the travel environment information received from the control server 50 by the communication_ECU 22 is wider-area information than the travel environment information acquired by the various autonomous sensing devices. Specifically, for example, as illustrated in FIG. 4, each of the autonomous sensing devices is configured to acquire, at most, the travel environment information covering a range in which the vehicle 5 travels for three seconds. In contrast, the travel environment information received from the control server 50 is, for example, wide-area information covering a range in which the vehicle 5 travels for 30 seconds.

The travel_ECU 21 calculates various kinds of control information to make an autonomous travel control (driving control) based on each piece of the travel environment information described above.

For example, the travel_ECU 21 calculates a target acceleration deceleration rate as the control information to make an adaptive cruise control (ACC: Adaptive Cruise Control) based on the travel environment information and the like. That is, when a preceding vehicle is present ahead of the vehicle 5, the travel_ECU 21 calculates the target acceleration deceleration rate to allow the vehicle 5 to follow the preceding vehicle. Moreover, when there is no preceding vehicle ahead of the vehicle 5, the travel_ECU 21 calculates the target acceleration deceleration rate to allow the vehicle 5 to travel at a constant speed at a set vehicle speed. Furthermore, the travel_ECU 21 outputs the calculated target acceleration deceleration rate to the E/G_ECU 23 and BK_ECU 25. Thus, the E/G_ECU 23 and the BK_ECU 25 are configured to make an acceleration deceleration control based on the target acceleration deceleration rate.

Moreover, the travel_ECU 21 calculates a target steering angle as the control information to make an active lane keep centering (ALKC: Active Lane Keep Centering) control based on the travel environmental information and the like. That is, the travel_ECU 21 calculates the target steering angle to keep the subject vehicle to the middle of a travel lane of the subject vehicle, based on the traveling environment information and the like. Moreover, the travel_ECU 21 outputs the calculated target steering angle to the PS_ECU 24. Thus, the PS_ECU 24 is configured to make a steering control based on the target steering angle.

Furthermore, for example, the travel_ECU 21 calculates a target deceleration rate as the control information to make an emergency brake control, based on the travel environment information. That is, for example, the travel_ECU 21 calculates collision margin time TTC (=(relative distance)/(relative speed)) with respect to an obstacle present ahead of the vehicle 5. Moreover, when the collision margin time TTC becomes equal to or less than a threshold value set in advance, the travel_ECU 21 calculates the target deceleration rate. In addition, the travel_ECU 21 outputs the calculated target deceleration rate to the BK_ECU 25. Thus, the BK_ECU 25 is configured to make a deceleration control based on the target deceleration rate. Furthermore, in calculating the target deceleration rate, the travel_ECU 21 gives an alarm command to the alarm_ECU 26. Thus, the alarm_ECU 26 is configured to make an alarm control for an occupant.

Furthermore, the travel_ECU 21 is configured to make, for example, a lane change control to change the travel lane of the vehicle 5, and an emergency steering control to avoid collision between the vehicle 5 and an obstacle.

By appropriately combining multiple controls including each of these controls, the travel_ECU 21 is configured to realize the travel control (autonomous travel control). As described, in this embodiment, the travel_ECU 21 corresponds to a specific example of a first travel controller.

Here, levels of the travel control (driving control) of this embodiment are defined in six stages: Level 0 (no automated driving); Level 1 (driver assistance); Level 2 (partial automated driving); Level 3 (conditional automated driving); Level 4 (advanced automated driving); and Level 5 (fully automated driving). These levels of the travel control are configured to change stepwise in accordance with, for example, a state of acquisition (reliability, etc.) of the travel environment information.

Let us define the travel environment information acquired by the first autonomous sensor group as "Ide1", the travel environment information acquired by the second autonomous sensor group as "Ide2", and the travel environment information received from the control server 50 as "Ide3". Then, the reliability of the travel environment information is, for example, in the following order.

$$(Ide1+Ide2+Ide3)>(Ide2+Ide3)>(Ide1+Ide2)>(Ide1)>(Ide2)$$

For example, the travel_ECU 21 is configured to change the levels of the travel control stepwise in accordance with the reliability of the travel environment information that changes in this manner.

To the communication_ECU 22, a transceiver 19 is coupled as a communication device to perform "communication coupling a vehicle to everything". Here, "communication coupling a vehicle to everything" refers to, for example, cellular V2X communication, or a communication form in which 4G or 5G network access technology and narrow-area communication (DSRC) technology, or even cellular V2X (C-V2X) communication technology are integrated. In this embodiment, "everything to be coupled to the vehicle 5" includes, for example, the control server 50, other vehicles around the vehicle 5, and portable terminals.

The transceiver 19 is configured to perform packet-switched communication using, for example, the HTTP (Hypertext Transfer Protocol) protocol or the MQTT (Message Queue Telemetry Transport) protocol.

By this packet-switched communication, the communication_ECU 22 is configured to transmit, for example, various kinds of information indicating the state of the vehicle 5 (such as a speed, the acceleration rate, a direction of travel, positional information, and a failure code of the vehicle 5) to the control server 50 in real time. Moreover, the communication_ECU 22 is configured to transmit in real time, for example, the travel environment information detected by the various autonomous sensing devices of the vehicle 5, to the control server 50. Furthermore, the communication_ECU 22 is configured to receive in real time, for example, the control information (described later) to make a remote-type travel control (driving control) of the vehicle 5, from the control server 50. In addition, the communication_ECU 22 is configured to receive in real time, for example, the travel environment information regarding the surroundings of the vehicle 5 from the control server 50.

Moreover, the transceiver 19 is configured to perform circuit-switched communication using, for example, the SMPP (Short Message Peer to Peer) protocol. This circuit-switched communication is configured to perform stable communication with a small amount of data even in an emergency or a disaster, as compared with the packet-switched communication. Thus, the circuit-switched communication is used mainly when, for example, an abnormality occurs in the packet-switched communication.

As described, in this embodiment, the communication_ECU 22 corresponds to a specific example of a first communication controller.

To output side of the E/G_ECU 23, a throttle actuator 27 and the like are coupled. The throttle actuator 27 causes opening and closing operation of a throttle valve of an electronically controlled throttle provided in a throttle body of an engine. That is, the throttle actuator 27 causes the opening and closing operation of the throttle valve by a drive signal from the E/G_ECU 23. Thus, the throttle actuator 27 adjusts an intake air flow rate and generates a desired engine output.

To output side of the PS_ECU 24, an electric power steering motor 28 and the like are coupled. The electric power steering motor 28 applies steering torque to a steering mechanism. That is, the electric power steering motor 28 generates a desired steering angle by a drive signal from the PS_ECU 24.

To output side of the BK_ECU 25, a brake actuator 29 and the like are coupled. The brake actuator 29 adjusts brake hydraulic pressure to be supplied to a brake wheel cylinder provided in each wheel. That is, when driven by a drive signal from the BK_ECU 25, the brake actuator 29 generates a brake force for each wheel through the brake wheel cylinder.

To output side of the alarm_ECU 26, an alarm device 30 and the like are coupled. The alarm device 30 gives a predetermined alarm to a driver. Here, the alarm device 30 includes, for example, a multi-information display, a speaker, or the like provided on an instrument panel. That is, the alarm device 30 provides predetermined alarm display to the driver or gives an alarm sound to the driver by a drive signal from the alarm_ECU 26.

Here, the ECUs such as the E/G_ECU 23, the PS_ECU 24, the BK_ECU 25, and the alarm_ECU 26 each have a self-diagnosis function. When a predetermined failure is detected by self-diagnosis of each ECU, each ECU outputs a predetermined failure code or the like to the communication_ECU 22.

The control server 50 is disposed, for example, for each predetermined control area. The control server 50 is, for example, an edge server (so-called MEC server) of a network environment by edge computing.

The control server 50 includes, as various control units, for example, a communication control unit (hereinafter, referred to as "communication_ECU") 51, an information recognition control unit (hereinafter, referred to as "information recognition_ECU") 52, a travel control unit (hereinafter, referred to as "travel_ECU") 53. These ECUs 51 to 53 are coupled together by a predetermined communication line. Here, each of the ECUs 51 to 53 has specifications of higher performance than each ECU to be mounted on the vehicle 5. Moreover, programs to control each of the ECUs 51 to 53 are configured to be constantly updated to the latest programs.

To the communication_ECU 51, a transceiver 55 is coupled as a communication device.

The transceiver 55 is configured to perform the packet-switched communication using, for example, the HTTP protocol or the MQTT protocol.

By this transceiver 55, the communication_ECU 51 is configured to perform the packet-switched communication with, for example, the multiple vehicles 5 present in the control area, the vehicle external driving control device 70, and various sensing devices (unillustrated) installed along the road, in a parking lot, and the like.

For example, the communication_ECU 51 is configured to perform packet communication with the transceiver 19 mounted on each vehicle 5, by using the transceivers 55. Thus, the communication_ECU 51 is configured to receive, in real time, the various kinds of information indicating the state of each vehicle 5 (such as the speed, the acceleration rate, the direction of travel, the positional information, and the failure code of the vehicle 5). Moreover, the communication_ECU 51 is configured to receive, in real time, the travel environment information detected by the autonomous sensing devices of each vehicle 5. Furthermore, the communication_ECU 51 is configured to transmit, in real time, the individual control information for each vehicle 5, to each vehicle 5.

In addition, the transceiver 55 is configured to perform the circuit-switched communication using, for example, the SMPP protocol.

By this transceiver 55, the communication_ECU 51 is configured to perform the circuit-switched communication with, for example, the multiple vehicles 5 present in the control area, the vehicle external driving control device 70, and the various sensing devices (unillustrated) installed along the road, in a parking lot, and the like.

For example, the communication_ECU 51 is configured to perform the circuit-switched communication with the transceiver 19 mounted on each vehicle 5, by using the transceiver 55. This makes it possible to maintain the communication between the control server 50 and each vehicle 5 (the driving control device 20) as predetermined, even when an abnormality occurs in the packet communication.

As described, in the embodiment, the communication_ECU 51 corresponds to a specific example of a second communication controller.

The information recognition_ECU 52 recognizes, in real time, the travel environment information in the control area, based on, for example, the travel environment information collected from each vehicle 5, the various sensing devices, and the like by the packet communication. The recognition of the travel environment information is made by, for example, sequentially updating the roadmap information based on the collected travel environment information.

Accordingly, to the information-recognition_ECU 52, a roadmap database 52*a* is coupled. This roadmap database 52*a* holds high-precision roadmap information (dynamic map) as the travel environment information. Moreover, the information recognition_ECU 52 recognizes the travel environment information by updating the roadmap information in real time by using the travel environment information received (collected) by the communication_ECU 51. The travel environment information thus recognized is transmitted to each vehicle 5 by the packet communication by the communication_ECU 51.

Here, for example, as illustrated in FIG. 6, in the roadmap information, a remote control inhibited area is set in advance. The remote control inhibited area is provided for inhibition of a remote travel control described later. As this inhibited area, for example, the following areas are set: an area in which a radio wave condition is constantly poor; an area in which monitoring by the various sensing devices such as a camera is hindered by a shielding object such as a wall; an area in which pedestrians or the like pass by, e.g., a crosswalk; and the like.

As described, in this embodiment, the information recognition_ECU 52 corresponds to a specific example of a second travel environment information obtainer.

The travel_ECU 53 is configured to make the travel control (remote travel control) of each vehicle 5 from a remote spot. Here, the travel_ECU 53 is configured to act as a substitute, by the remote travel control, to make all of the autonomous travel control to be made by the in-vehicle travel_ECU 21. Alternatively, the travel_ECU 53 is configured to act as the substitute, by the remote travel control, to make a part of the autonomous travel control to be made by the in-vehicle travel_ECU 21.

Thus, the travel_ECU 53 calculates various kinds of the control information to make the remote travel control of each vehicle 5 present in the control area. In this case, the travel_ECU 53 calculates various kinds of the control information based on, for example, the travel environment information (roadmap information) and the like updated in real time in the information recognition_ECU 52. The calculation of these pieces of the control information is, for example, similar to the calculation of the control information to be made by the in-vehicle travel_ECU 21 to make the autonomous travel control. However, the calculation of the various kinds of the control information by the travel_ECU 53 is limited with respect to the vehicle 5 present in the remote control inhibited area.

As described, in this embodiment, the travel_ECU 53 corresponds to a specific example of a second travel controller.

The vehicle external driving control device 70 has, for example, a function of acting as a substitute to make the remote travel control of each vehicle 5 to be made by the travel_ECU 53 of the control server 50. The vehicle external driving control device 70 includes, for example, a communication control unit (hereinafter, referred to as "communication_ECU") 71 and a travel control unit (hereinafter, referred to as "travel_ECU") 72.

To the communication_ECU 71, a transceiver 73 is coupled as a communication device.

The transceiver 73 is configured to perform the packet-switched communication using, for example, the HTTP protocol or the MQTT protocol.

By the transceiver 73, the communication_ECU 71 is configured to perform the packet communication with, for example, the control server 50.

For example, the communication_ECU 71 is configured to receive, in real time, for example, the travel environment information recognized by the information recognition_ECU 52. Moreover, the communication_ECU 71 is configured to transmit, in real time, for example, the control information regarding a specific vehicle 5 to the control server 50.

Moreover, the transceiver 73 is configured to perform, for example, the circuit-switched communication using the SMPP protocol.

By this transceiver 73, the communication_ECU 71 is configured to perform the circuit-switched communication with, for example, the control server 50.

Thus, it is possible to maintain the communication between the vehicle external driving control device 70 and the control server 50 as predetermined, even when an abnormality occurs in the packet communication.

As described, in this embodiment, the communication_ECU 71 corresponds to a specific example of a third communication controller.

The travel_ECU 72 is configured to act for the travel_ECU 53 of the control server 50 to make the travel control (remote travel control) of the specific vehicle 5. In this case, the travel_ECU 72 calculates various kinds of the control information based on, for example, the travel environment information (roadmap information) and the like received in real time by the communication_ECU 71 from the control server 50. The calculation of these pieces of the control information is similar to, for example, the calculation of the control information to be made by the in-vehicle travel_ECU 21 to make the autonomous travel control.

As described, in this embodiment, the travel_ECU 72 corresponds to a specific example of a third travel controller.

It is to be noted that, in the vehicle external driving control device 70, an operation input device (unillustrated) such as a touch screen or an operation lever may be disposed as the third travel controller, in place of the travel_ECU 72. In this case, in the vehicle external driving control device 70, the user or the like operates the operation input device based on the travel environment information, to make the remote travel control (remote operation) of the vehicle 5.

Next, description is given of countermeasures against failures (safety measures) when various failures occur while the remote travel control is being carried out, in the driving control system 1 configured as described.

To realize the countermeasures against the failures on the occasion of the remote travel control, the communication_ECU 22 of the vehicle 5 (the driving control device 10) monitors a communication failure with the control server 50. For example, the communication_ECU 22 periodically transmits a PING command to the control server 50 by using the packet-switched communication. In this way, the communication_ECU 22 confirms a communication response rate from the control server 50 with respect to the PING command.

Thus, when determining that the communication response rate from the control server 50 is in decline, the communication_ECU 22 notifies the control server 50 of the decline in the communication response rate by the circuit-switched communication using the transceiver 19. Here, a state in which the communication response rate is in decline refers to a state in which, for example, although the packet-switched communication is established, a communication speed has lowered to a level insufficient to make the appropriate remote travel control. Accordingly, even when the communication response rate is in decline, the packet-switched communication is continued as predetermined.

When notified of the decline in the communication response rate, the communication_ECU 51 of the control server 50 commands the relevant vehicle 5 to switch from the remote travel control to the autonomous travel control. That is, the communication_ECU 51 interrupts the remote travel control before an abnormality occurs in the packet-switched communication, and switches the travel control of the vehicle 5 to the autonomous travel control. Moreover, when the remote travel control (remote operation) of the relevant vehicle 5 is being made by the vehicle external driving control device 70, the communication_ECU 51 requests the vehicle external driving control device 70 to stop the remote travel control.

Moreover, the communication_ECU 51 of the control server 50 monitors communication reliability with the vehicle 5. For example, the communication_ECU 51 monitors the communication reliability based on frequency of packet reception from the vehicle 5 per unit time. Thus, the communication_ECU 51 determines that an abnormality has occurred in the packet communication with the vehicle 5 when the frequency of packet reception from the vehicle 5 declines and the communication reliability declines.

When determining that the communication reliability is in decline, the communication_ECU 51 commands, for example, the corresponding vehicle 5 to make an emergency vehicle stop by the autonomous travel control. Moreover, the communication_ECU 51 commands, for example, the vehicle external driving control device 70 to stop the remote travel control. Furthermore, the communication_ECU 51 notifies surrounding vehicles, pedestrians, or the like of the presence of the vehicle with the abnormality by simultaneous notification.

Furthermore, the communication_ECU 51 of the control server 50 monitors a communication failure in the control area. Thus, the communication_ECU 51 determines, for example, reliability of the packet communication with each vehicle 5 present in the control area. Moreover, the communication_ECU 51 determines a communication failure level for each travel lane in the control area, based on the communication reliability with each vehicle 5. In this way, the communication_ECU 51 changes stepwise the driving control of the vehicle 5 present in each travel lane in accordance with the determined communication failure level.

In addition, when receiving the failure code from the vehicle 5, the communication_ECU 51 commands the relevant vehicle 5 to make the emergency vehicle stop, and prompts those around the vehicle 5 to take a countermeasure against the failed vehicle.

Next, description is given of a determination to be made by the communication_ECU 22 as to a communication failure (determination as to the decline in the communication response rate) between the vehicle 5 and the control server 50, with reference to a flowchart of a routine of the determination as to the communication response rate illustrated in FIG. 7.

This routine is repeatedly carried out at every set time in the communication_ECU 22. At a start of the routine, in step S101, the communication_ECU 22 transmits the PING command to the control server 50. More specifically, the communication_ECU 22 transmits the PING command to the transceiver 55 of the control server 50 by the packet communication using the transceiver 19.

In subsequent step S102, the communication_ECU 22 calculates a moving average value of RTT (Round-Trip Time) of the PING command in the past set time (for example, the past 10 seconds).

In subsequent step S103, the communication_ECU 22 checks whether or not the decline in the communication response rate between the vehicle 5 and the control server 50 has occurred, based on the RTT moving average value.

Moreover, in step S103, when determining that no decline in the communication response rate has occurred (step S103: NO), the communication_ECU 22 exits the routine as it is.

In contrast, in step S103, when determining that the decline in the communication response rate has occurred (step S103: YES), the communication_ECU 22 causes the flow to proceed to step S104.

Moreover, in step S104, the communication_ECU 22 notifies the control server 50 of the decline (abnormality) in the communication response rate, and thereafter, exits the routine. In this case, the communication_ECU 22 notifies the control server 50 of the decline in the communication response rate by, for example, the circuit-switched communication (SMS communication) using the transceiver 19. This is because such circuit-switched communication allows for more stable communication than the packet communication.

Next, description is made of a failure countermeasure control on the occasion of the communication failure between the vehicle 5 and the control server 50, with reference to a flowchart of routine of the failure countermeasure control illustrated in FIG. 8. It is to be noted that this failure countermeasure control is repeatedly carried out, for example, at every set time in the communication_ECU 51 of the control server 50. In this case, the communication_ECU 51 makes the failure countermeasure control for each vehicle 5 in accordance with the communication failure determined individually between each vehicle 5 and the control server 50. Accordingly, the failure countermeasure control in the following is carried out individually for each vehicle 5.

At a start of the routine, in step S201, the communication_ECU 51 calculates the communication reliability with the vehicle 5. The communication reliability is calculated based on, for example, the frequency at which the transceiver 55 receives packet data from the vehicle 5 per unit time. In this case, for example, the lower the frequency at which the transceiver 55 receives the packet data from the vehicle 5 per unit time, the lower the calculated communication reliability.

In subsequent step S202, the communication_ECU 51 checks whether or not the decline in the communication reliability calculated in step S201 described above has occurred. That is, for example, when the communication reliability is less than a predetermined threshold value, the communication_ECU 51 determines that general socket communication by the packet-switched method has failed, and that the decline in the communication reliability has occurred.

Thus, in step S202, when determining that the decline in the communication reliability with the vehicle 5 by the packet communication has occurred (step S202: YES), the communication_ECU 51 cause the flow to proceed to step S207.

In contrast, in step S202, when determining that no decline in the communication reliability with the vehicle 5 by the packet communication has occurred (step S202: NO), the communication_ECU 51 causes the flow to proceed to step S203.

In step S203, the communication_ECU 51 checks whether or not the decline in the communication response rate has occurred. That is, even in a case where the general socket communication by the packet-switched method is performed, it is difficult to make the appropriate remote travel control when the level of the communication performance necessary for the remote travel control is not satisfied. Accordingly, the communication_ECU 51 determines whether or not the communication response rate calculated in the communication_ECU 22 of the vehicle 5 has declined.

Moreover, in step S203, when determining that the communication response rate is equal to or higher than a threshold value and that no decline in the communication response rate has occurred (step S203: NO), the communication_ECU 51 causes the flow to proceed to step S204.

When the flow proceeds from step S203 to step S204, the communication_ECU 51 transmits various kinds of the control information for the remote travel control calculated by the travel_ECU 53 to the vehicles 5 by the packet communication using the transceiver 55. Thus, the communication_ECU 51 continues the remote travel control.

In contrast, in step S203, when determining that the communication response rate is less than the threshold value, and that the decline in the communication response rate has occurred (step S203: YES), the communication_ECU 51 causes the flow to proceed to step S205.

When the flow proceeds from step S203 to step S205, the communication_ECU 51 requests the vehicle 5 to start the autonomous travel control. Here, when the communication response rate has declined, the possibility is high that the level of the communication performance necessary for the remote travel control is not satisfied. In contrast, even in a case where the communication response rate has declined, when the communication reliability is maintained as predetermined, the possibility is high that the communication level is maintained at which the travel environment information from the control server 50 is received by the transceiver 19. Accordingly, the travel_ECU 21 of the vehicle 5 makes the autonomous travel control based on the travel environment information in which the travel environment information received from the control server 50 is added to the travel environment information acquired by the various autonomous sensing devices or the like. Thus, the communication_ECU 51 makes a transition of the travel control from the remote travel control to the autonomous travel control before the communication reliability declines (before a communication abnormality occurs).

Moreover, when the flow proceeds from step S205 to step S206, the communication_ECU 51 requests the vehicle external driving control device 70 to stop the remote operation, and thereafter, exits the routine. Thus, when there is a user (remote operator) who makes the remote operation of the vehicle 5 using the vehicle external driving control device 70, the relevant remote operator is notified of the request for the stop of the remote operation.

Here, the communication in steps S205 and S206 described above is performed using, for example, the circuit-switched communication. That is, the communication_ECU 51 gives, for example, the command for the switching of the travel control using the circuit-switched communication while maintaining the transmission and the reception of the travel environment information using the packet-switched communication.

When the flow proceeds from step S202 to step S207, the communication_ECU 51 notifies the vehicle 5 of the occurrence of the communication abnormality with the control server 50. Furthermore, the communication_ECU 51 requests the vehicle 5 to carry out the emergency vehicle stop control.

In subsequent step S208, the communication_ECU 51 notifies the vehicle external driving control device 70 of the occurrence of the abnormality in the communication between the vehicle 5 and the control server 50. Furthermore, the communication_ECU 51 requests the vehicle external driving control device 70 to perform processing to stop the remote travel control. Thus, for example, when the remote travel control of the vehicle 5 is being carried out by the travel_ECU 71 of the vehicle external driving control device 70, the relevant remote travel control is stopped.

In subsequent step S209, the communication_ECU 51 notifies other vehicles and pedestrians present around the vehicle 5 of the presence of the vehicle having the abnormality, or guides other vehicles and pedestrians to a safe evacuation location, and thereafter, exits the routine.

Here, the communication in steps S207 and S208 described above is performed by using, for example, the circuit-switched communication. Moreover, the communication in step S209 described above is performed by, for example, simultaneous distribution using the circuit-switched communication.

Next, description is given of the failure countermeasure control on the occasion of the communication abnormality in the control area, with reference to flowcharts of the routine of the failure countermeasure control illustrated in FIGS. 9 and 10. Here, while the control in FIG. 8 described above is the failure countermeasure control against each communication failure between each vehicle 5 and the control server 50, the control illustrated in FIGS. 9 and 10 includes making the failure countermeasure control after comprehensively determining the communication failure for each lane in the control area. This routine is repeatedly executed, for example, at every set time in the communication_ECU 51. Moreover, this routine is performed, for example, individually for each travel lane in the control area.

At a start of the routine, the communication_ECU 51 calculates the communication reliability in the travel lane as a current target in the control area, based on the communication reliability calculated for each vehicle 5 present in the control area.

The communication reliability in each travel lane is calculated based on the communication reliability of each vehicle 5 present in the travel lane. For example, the communication_ECU 51 calculates an average value of the reliability of the packet communication between each vehicle 5 present in the travel lane and the control server 50, as the communication reliability in the travel lane. Alternatively, the communication_ECU 51 calculates the smallest value among the reliability of the packet communication between each vehicle 5 present in the travel lane and the control server 50, as the communication reliability in the travel lane.

In subsequent step S302, the communication_ECU 51 checks whether or not the communication reliability in the travel lane has declined to less than a threshold value.

Moreover, in step S302, when determining that the communication reliability is equal to or higher than the threshold value (step S302: NO), the communication_ECU 51 causes the flow to proceed to step S303.

In step S303, the communication_ECU 51 determines that there is no communication failure in the target travel lane, and then exits the routine.

In contrast, in step S302, when determining that the communication reliability is less than the threshold value (step S302: YES), the communication_ECU 51 causes the flow to proceed to step S304.

In step S304, the communication_ECU 51 selects a distribution protocol with respect to the vehicles 5 present in the travel lane. That is, even in a case where the reliability of the packet communication has declined, when it is possible to distribute a command using the packet communication to each vehicle 5 in the travel lane, the communication_ECU 51 selects the packet communication as the distribution protocol. In contrast, when it is difficult to distribute a command using the packet communication to each vehicle 5 in the travel lane, the communication_ECU 51 selects the circuit-switched communication as the distribution protocol.

In subsequent step S305, the communication_ECU 51 checks elapsed time since the decline in the communication reliability in the travel lane to less than the threshold value.

Moreover, in step S306, the communication_ECU 51 checks whether or not a long time (set time or longer) has elapsed since the decline in the communication reliability in the travel lane to less than the threshold value.

Moreover, in step S306, when determining that the long time has elapsed (step S306: YES), the communication_ECU 51 causes the flow to proceed to step S309.

In contrast, in step S306, when determining that the long time has not elapsed (step S306: NO), the communication_ECU 51 causes the flow to proceed to step S307.

In step S307, the communication_ECU 51 determines that the communication failure level in the target travel lane is "1". Here, the communication failure level 1 means, for example, occurrence of a short-time, area-limited communication failure (communication interruption) in the target travel lane.

In subsequent step S308, the communication_ECU 51 commands each vehicle 5 in the target travel lane to perform automated driving under a WP (waypoint) control, by using the communication protocol selected in step S304, and thereafter, causes the flow to return to step S301. That is, the communication_ECU 51 commands each vehicle 5 to continue the automated driving based on various kinds of information (e.g., the travel environment information) shared with the control server 50.

When the flow proceeds from step S306 to step S309, the communication_ECU 51 determines that the communication failure level in the target travel lane is "2". Here, the communication failure level 2 means, for example, occurrence of a long-time, area-limited communication failure in the travel lane.

In subsequent step S310, the communication_ECU 51 commands each vehicle 5 in the target travel lane to degenerate the automated driving, by using the communication protocol selected in step S304, and thereafter, causes the flow to proceed to step S311. Here, for example, the communication_ECU 51 commands each vehicle 5 to decelerate to a predetermined speed, as the command to degenerate the automated driving. Alternatively, for example, the communication_ECU 51 commands each vehicle 5 to stop a predetermined control item, as the command to degenerate the automated driving.

In subsequent step S311, the communication_ECU 51 refers to a radio wave map set in advance and confirms an area where the communication service is provided. Furthermore, the communication_ECU 51 calculates the communication reliability in each travel lane other than the target travel lane by a similar process to step S301.

In subsequent step S312, the communication_ECU 51 checks, based on the radio wave map, presence or absence of the target travel lane in the area where the communication service is provided.

Moreover, in step S312, when determining the presence of the travel lane outside the area where the service is provided (step S312: NO), the communication_ECU 51 causes the flow to proceed to step S316.

In contrast, in step S312, when determining the presence of the travel lane in the area where the service is provided (step S312: YES), the communication_ECU 51 causes the flow to proceed to step S313.

In step S313, the communication_ECU 51 checks presence or absence of multiple travel lanes in which the communication failure has occurred, in addition to the target travel lane.

Moreover, in step S313, when determining the absence of the multiple travel lanes in which the communication failure has occurred (step S313: NO), the communication_ECU 51 causes the flow to proceed to step S309.

In contrast, in step S313, when determining the presence of the multiple travel lanes in which the communication failure has occurred (step S313: YES), in step S314, the communication_ECU 51 determines that the communication failure level in the target travel lane is "3". Here, the communication failure level 3 means, for example, occurrence of a long-time communication failure (large-scale communication failure) in a large-scale range including the target travel lane.

In subsequent step S315, the communication_ECU 51 commands each vehicles 5 in the target travel lane to perform the automated driving based on the travel environment information acquired mainly by the autonomous sensing devices, by using the communication protocol selected in step S304, and thereafter, exits the routine. It is to be noted that, in step S315, the communication_ECU 51 may perform the communication with each vehicle 5 by using a different communication carrier from the current communication carrier.

Moreover, when the flow proceeds from step S312 to step S316, the communication_ECU 51 determines that the communication failure level in the target travel lane is "0". Here, the communication failure level 0 means that, for example, the target travel lane is outside the communication service area.

In subsequent step S317, the communication_ECU 51 commands each vehicle 5 in the target travel lane to perform the automated driving based on the travel environment information acquired mainly by the autonomous sensing devices, by using the circuit-switched communication protocol, and thereafter, exits the routine. It is to be noted that, in step S317, the communication_ECU 51 may perform the communication with each vehicle 5 by using a different communication carrier from the current communication carrier.

Next, description is given of the failure countermeasure control on the occasion of a failure in the vehicle, with reference to a flowchart of a routine of the failure countermeasure control illustrated in FIG. 11. This routine is repeatedly executed, for example, at every set time in the communication_ECU 51.

At a start of the routine, in step S401, the communication_ECU 51 confirms vehicle information transmitted from each vehicle 5.

In subsequent step S402, the communication_ECU 51 checks presence or absence of the vehicle 5 that has transmitted the failure code to the control server 50.

Moreover, in step S402, when determining the absence of the vehicle 5 that has transmitted the failure code (step S402: NO), the communication_ECU 51 exits the routine as it is.

In contrast, in step S402, when determining the presence of the vehicle 5 that has transmitted the failure code (step S402: YES), the communication_ECU 51 causes the flow to proceed to step S403.

In step S403, the communication_ECU 51 stops the remote travel control of the relevant vehicle 5 and commands the relevant vehicle 5 to make an emergency stop.

In subsequent step S404, the communication_ECU 51 commands the vehicle external driving control device 70 to stop the remote operation and thereafter, shift to processing to stop the remote operation.

Furthermore, in step S405, the communication_ECU 51 supplies vehicle abnormality information to other vehicles, dealers, and the like present around the vehicle 5, and thereafter, exits the routine.

According to such an embodiment, the driving control system 1 includes: the communication_ECU 22 that is provided in the vehicle 5 and performs communication with the outside by selectively using the packet-switched communication or the circuit-switched communication; the communication_ECU 51 that is provided in the control server 50 and performs communication with the outside by selectively using the packet-switched communication or the circuit-switched communication; the autonomous sensing devices (11 to 14) that is provided in the vehicle 5 and acquires the travel environment information; the information recognition_ECU 52 that is provided in the control server 50 and acquires the travel environment information based on information collected by using the packet-switched communication; the travel_ECU 21 that is provided in the vehicle 5 and makes the autonomous travel control of the vehicles 5 based on the travel environment information; and the travel_ECU 53 that is provided in the control server 50 and makes the remote travel control of the vehicle 5 based on the travel environment information. Moreover, when the communication_ECU 51 recognizes the decline in the communication response rate with the vehicle 5 or the communication abnormality while making the remote travel control by using the packet-switched communication, the communication_ECU 51 commands, by using the circuit-switched communication, the vehicle 5 to switch from the remote travel control to the autonomics travel control. Hence, it is possible to balance between securing convenience and securing safety by the driving control of the driving control system 1.

That is, when the communication_ECU 51 recognizes the decline in the communication response rate with the vehicle 5 or the decline in the communication reliability (communication abnormality) while making the remote travel control by using the packet-switched communication, the communication_ECU 51 commands, by using the circuit-switched communication, the vehicle 5 to switch to the autonomous travel control. Here, the circuit-switched communication makes it possible to perform stable communication with a smaller amount of data in an emergency or a disaster, as compared to the packet-switched communication. This makes it possible for the communication_ECU 51 to accurately and quickly command the vehicle 5 to switch from the remote travel control to the autonomous travel control even when a failure occurs in the packet-switched communication. Hence, it is possible to shift from the remote travel control to the autonomous travel control and continue the travel control before the stable remote travel control becomes difficult. This makes it possible to secure a high level of safety and convenience.

In this case, the vehicle 5, the control server 50, and the vehicle external driving control device 70 use respectively the single transceivers 19, 55, and 73, to ensure redundancy by multiplexing the communication protocols. Hence, even on the occasion of a failure in the packet communication, it is possible to ensure, with a simple configuration, communication for the devices to give necessary notification by the circuit-switched communication.

Moreover, when the decline in the communication response rate is recognized as the communication failure, the communication_ECU 51 continues the packet-switched communication and maintains the transmission and the reception of the travel environment information. Thus, the travel_ECU 21 makes the autonomous travel control based on the travel environment information in which the travel environment information received from the control server 50 is added to the travel environment information acquired by the autonomous sensing devices (11 to 14) or the like. Hence, it is possible to realize the autonomous travel control with a high level of safety by using the wider-area travel environment information than the travel environment information acquired by the autonomous sensing devices (11 to 14) alone.

Furthermore, when the decline in the communication reliability of the packet communication (communication abnormality) is recognized as the communication failure, the travel_ECU 21 allows the vehicle 5 to make the emergency stop at a safe place by the autonomous travel control based on the travel environment information acquired by the autonomous sensing devices (11 to 14) or the like. Hence, it is possible to ensure a high level of safety without continuing the excessive travel control.

In addition, the communication_ECU 51 evaluates the communication reliability for each travel lane in the control area. Even in a case where there is no abnormality in the packet communication itself between the vehicle 5 and the control server 50, when a communication abnormality occurs in the travel lane on which the vehicle 5 travels, the communication_ECU 51 causes stepwise degeneration of in the level of the travel control of the vehicle 5 in accordance with the level of the communication failure. Thus, on the occasion of the communication abnormality, it is possible to take a comprehensive countermeasure against the failure with respect to each vehicle 5 present on the travel lane, and realize a higher level of safety of the travel control.

Here, in the forgoing embodiment, the image recognition-_ECU 11*d*, the locator_ECU 20, the corresponding_ECU 21, the communication_ECU 22, the communication_ECU 51, the information recognition_ECU 52, the travel_ECU 53, the communication_ECU 71, and the travel_ECU 72 include, for example, a known microcomputer and peripheral devices thereof. The microcomputer includes, for example, a CPU, a RAM, a ROM, and a nonvolatile storage. The ROM holds in advance a program to be executed by the CPU and fixed data such as a data table. It is to be noted that all or a part of the functions of the processor may be constituted by a logic circuit or an analog circuit. Moreover, the processing of the various programs may be implemented by electronic circuits such as an FPGA.

It is to be noted that the invention is by no means limited to the embodiments described above. It should be appreciated that modifications and alterations may be made, and the modifications and the alterations are also included in the scope of the invention.

The invention claimed is:

1. A driving control system comprising:

a first communication controller configured to be provided in a vehicle and perform communication with outside by selectively using packet-switched communication or circuit-switched communication;

a second communication controller configured to be provided in a control server and perform communication with outside by selectively using the packet-switched communication or the circuit-switched communication;

a first travel environment information obtainer configured to be provided in the vehicle and acquire first travel environment information using an autonomous sensor;

a second travel environment information obtainer configured to be provided in the control server and acquire second travel environment information based on information collected by using the packet-switched communication;

a first travel controller configured to be in the vehicle and make an autonomous travel control of the vehicle based on the first travel environment information; and a second travel controller configured to be provided in the control server and makes a remote travel control of the vehicle based on the second travel environment information, wherein the second travel controller is configured to, when the second travel controller recognizes a decline in a communication response rate with the vehicle or a communication abnormality while making the remote travel control by using the packet-switched communication, command, by using the circuit-switched communication, the vehicle to switch from the remote travel control to the autonomous travel control.

2. The driving control system according to claim 1, wherein the first communication controller is configured to receive, from the control server, the second travel environment information covering a wider area than the first travel environment information, and the first travel controller is configured to make the autonomous travel control based on the first travel environment information to which the second travel environment information is added.

3. The driving control system according to claim 2, wherein the second communication controller is configured to, when the decline in the communication response rate is recognized, continue transmitting the second travel environment information by using the packet-switched communication, and the first travel controller is configured to, when the decline in the communication response rate is recognized, make the autonomous travel control based on the first travel environment information to which the second travel environment information is added.

4. The driving control system according to claim 2, wherein the first travel controller is configured to, when the communication abnormality is recognized, allow the vehicle to make an emergency stop by the autonomous travel control based on the first travel environment information.

5. The driving control system according to claim 1, further comprising:

a third communication controller configured to be provided in a vehicle external driving control device configured to make a driving control of the vehicle through the control server, and perform communication with outside by selectively using the packet-switched communication or the circuit-switched communication; and a third travel controller configured to be provided in the vehicle external driving control device and make the remote travel control of the vehicle based on the second travel environment information received from the control server by using the packet-switched communication, wherein the second communication controller is configured to, when the second communication controller recognizes the decline in the communication response rate with the vehicle or the communication abnormality while making the remote travel control by using the packet-switched communication, command, by using the circuit-switched communication, the vehicle external driving control device to stop the remote travel control.

6. The driving control system according to claim 2, further comprising:

a third communication controller configured to be provided in a vehicle external driving control device configured to make a driving control of the vehicle through the control server, and perform communication with outside by selectively using the packet-switched communication or the circuit-switched communication; and a third travel controller configured to be provided in the vehicle external driving control device and make the remote travel control of the vehicle based on the second travel environment information received from the control server by using the packet-switched communication, wherein the second communication controller is configured to, when the second communication controller recognizes the decline in the communication response rate with the vehicle or the communication abnormality while making the remote travel control by using the packet-switched communication, command, by using the circuit-switched communication, the vehicle external driving control device to stop the remote travel control.

7. The driving control system according to claim 3, further comprising:

a third communication controller configured to be provided in a vehicle external driving control device configured to make a driving control of the vehicle through the control server, and perform communication with outside by selectively using the packet-switched communication or the circuit-switched communication; and a third travel controller configured to be provided in the vehicle external driving control device and make the remote travel control of the vehicle based on the second travel environment information received from the control server by using the packet-switched communication, wherein the second communication controller is configured to, when the second communication controller recognizes the decline in the communication response rate with the vehicle or the communication abnormality while making the remote travel control by using the packet-switched communication, command, by using the circuit-switched communication, the vehicle external driving control device to stop the remote travel control.

8. The driving control system according to claim 4, further comprising:

a third communication controller configured to be provided in a vehicle external driving control device configured to make a driving control of the vehicle through the control server, and perform communication with outside by selectively using the packet-switched communication or the circuit-switched communication; and a third travel controller configured to be provided in the vehicle external driving control device and make the remote travel control of the vehicle based on the second travel environment information received from the control server by using the packet-switched communication, wherein the second communication controller is configured to, when the second communication controller recognizes the decline in the communication response rate with the vehicle or the communication abnormality while making the remote travel control by using the packet-switched communication, command, by using the circuit-switched communication, the vehicle external driving control device to stop the remote travel control.

9. A driving control system comprising:

a first transceiver configured to be provided in a vehicle and perform packet-switched communication and circuit-switched communication;

an autonomous sensor configured to be provided in the vehicle and acquire first travel environment information;

a first processor configured to be provided in the vehicle;

a second transceiver configured to be provided in a control server and perform the packet-switched communication and the circuit-switched communication; and a second processor configured to be provided in the control server, wherein the first processor is configured to perform communication with outside by selectively using the packet-switched communication or the circuit-switched communication by the first transceiver, and make an autonomous travel control of the vehicle based on the first travel environment information, and the second processor is configured to perform communication with outside by selectively using the packet-switched communication or the circuit-switched communication by the second transceiver, acquire second travel environment information based on information collected by using the packet-switched communication, make a remote travel control of the vehicle based on the second travel environment information, and when recognizing a decline in a communication response rate with the vehicle or a communication abnormality while making the remote travel control by using the packet-switched communication, command, by using the circuit-switched communication, the vehicle to switch from the remote travel control to the autonomous travel control.

10. A control server configured to communicate with a vehicle, the vehicle comprising:

a first communication controller configured to perform communication with outside by selectively using packet-switched communication and circuit-switched communication;

a first travel environment information obtainer configured to acquire first travel environment information using an autonomous sensor; and a first travel controller configured to make an autonomous travel control of the vehicle based on the first travel environment information, the control server comprising:

a second communication controller configured to perform communication with outside by selectively using the packet-switched communication or the circuit-switched communication; and a second travel environment information obtainer configured to acquire second travel environment information based on information collected by using the packet-switched communication; and a second travel controller configured to make a remote travel control of the vehicle based on the second travel environment information, wherein the second travel controller is configured to, when the second travel controller recognizes a decline in a communication response rate with the vehicle or a communication abnormality while making the remote travel control by using the packet-switched communication, command, by using the circuit-switched communication, the vehicle to switch from the remote travel control to the autonomous travel control.

11. A vehicle comprising:

a communication controller configured to perform communication with a control server by selectively using packet-switched communication or circuit-switched communication;

an autonomous sensor configured to acquire travel environment information; and a travel controller configured to make an autonomous travel control based on the travel environment information and a remote travel control based on a command from the control server, wherein the communication controller is configured to, while making the remote travel control by using the packet-switched communication, determine a communication state with the control server by the packet-switched communication, and when the communication state is in decline to a predetermined level, transmit, by using the circuit-switched communication, a signal indicating the decline in the communication state, to the control server, and receive a signal indicating a travel control switching command transmitted from the control server by using the circuit-switched communication in accordance with the decline in the communication state, and the travel controller is configured to switch from the remote travel control to the autonomous travel control based on the signal indicating the travel control switching command.

* * * * *